United States Patent
Rotem et al.

(10) Patent No.: US 11,349,780 B2
(45) Date of Patent: May 31, 2022

(54) ENHANCING PORT LINK-UP TIME

(71) Applicant: MELLANOX TECHNOLOGIES, LTD., Yokneam (IL)

(72) Inventors: Sagi Rotem, Adi (IL); Zvi Rechtman, Petach Tikva (IL); Lavi Koch, Tel Aviv (IL); Roee Shapiro, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 48 days.

(21) Appl. No.: 17/010,892

(22) Filed: Sep. 3, 2020

(65) Prior Publication Data
US 2022/0070117 A1 Mar. 3, 2022

(51) Int. Cl.
*H04L 1/00* (2006.01)
*H04L 49/00* (2022.01)
*G06F 9/4401* (2018.01)

(52) U.S. Cl.
CPC ........ *H04L 49/3054* (2013.01); *G06F 9/4403* (2013.01)

(58) Field of Classification Search
CPC ............. H04L 49/3054; H04L 41/0672; H04L 41/082; H04L 41/0853; G06F 13/4022; G06F 9/4416
See application file for complete search history.

(56) References Cited

U.S. PATENT DOCUMENTS

| | | | |
|---|---|---|---|
| 7,801,027 B2 | 9/2010 | Kagan et al. | |
| 9,250,919 B1 * | 2/2016 | Narey | G06F 9/441 |
| 10,031,763 B1 * | 7/2018 | Siebenthaler | G06F 13/4022 |
| 10,496,307 B1 * | 12/2019 | Peros | G06F 3/0683 |
| 2006/0282654 A1 * | 12/2006 | Veen | G06F 9/4418 713/1 |
| 2007/0260867 A1 * | 11/2007 | Ethier | G06F 9/4418 713/2 |
| 2011/0055538 A1 * | 3/2011 | Cho | H04N 21/4436 713/2 |
| 2013/0042097 A1 * | 2/2013 | Baik | G06F 9/4401 713/2 |

(Continued)

OTHER PUBLICATIONS

Texas Instruments Incorporated, "Fast Startup for Industrial Ethernet Applications with AM335X Processors," TIDUAL8A, pp. 1-25, Sep.-Oct. 2015.

(Continued)

*Primary Examiner* — Abdelnabi O Musa
(74) *Attorney, Agent, or Firm* — Kligler & Associates Patent Attorneys Ltd

(57) ABSTRACT

A network element includes at least one communication port and a processor. The communication port is configured to communicate with a peer communication port of a peer network element. The processor is configured to support a full-boot mode and a fast-boot mode, to establish, by negotiation with the peer network element, whether the fast-boot mode is supported both for the communication port and for the peer communication port, and, in response to finding that the fast-boot mode is supported both for the communication port and for the peer communication port, to coordinate with the peer network element a boot of the communication port and of the peer communication port, both using the fast-boot mode.

19 Claims, 3 Drawing Sheets

(56) References Cited

U.S. PATENT DOCUMENTS

2020/0097281 A1 3/2020 Haramaty et al.
2021/0334195 A1* 10/2021 Sethi .................... G06F 9/4411

OTHER PUBLICATIONS

Bucur et al., "Equalization Techniques for High Data Rates," IEEE 23rd International Symposium for Design and Technology in Electronic Packaging (SIITME), pp. 130-133, Constanta, Romania, Oct. 26-29, 2017.

* cited by examiner

ENHANCING PORT LINK-UP TIME

FIELD OF THE INVENTION

The present invention relates generally to communication networks, and particularly to methods and systems for enhancing the boot time of network elements in communication networks.

BACKGROUND

The process of reconnecting a network element that has been disconnected (e.g., for software update) to the network may incur, inter alia, link-up time, i.e., time spent in re-establishing a link with a peer network element.

Methods to shorten link-up time are described, for example, in a Texas Instruments publication entitled "Fast Startup for Industrial Ethernet Applications With AM335x Processors," TIDUAL8A-September 2015 (Revised October 2015). The document describes fast startup analysis of key system components, and presents an example for ARM® secondary bootloader with fast start-up functionality and a NOR flash/SPI flash timing configuration example.

U.S. Pat. No. 10,031,763 describes a network switch that can be configured using a boot loader after a reset of a controller within the network switch, wherein the boot loader configures switching logic within the network switch prior to an operating system becoming operational; by allowing the boot loader to configure the switching logic, the network switch quickly becomes operational.

SUMMARY

An embodiment of the preset invention that s described herein provides a network element, including at least one communication port and a processor. The communication port is configured to communicate with a peer communication port of a peer network element. The processor is configured to support a full-boot mode and a fast-boot mode, to establish, by negotiation with the peer network element, whether the fast-boot mode is supported both for the communication port and for the peer communication port, and, in response to finding that the fast-boot mode is supported both for the communication port and for the peer communication port, to coordinate with the peer network element a boot of the communication port and of the peer communication port, both using the fast-boot mode.

In an embodiment, the processor is configured to receive from the peer network element a notification that indicates that the peer network element supports the fast-boot mode, and, in response to the notification, boot the communication port using the fast-boot mode. In another embodiment, the processor is configured to send to the peer network element a notification that indicates that the fast-boot mode is supported for the communication port, and that requests the peer network element to boot the peer communication port using the fast-boot mode.

In some embodiments, when booting the communication port using the full-boot mode, the processor is configured to estimate values of one or more parameters for the communication port, and when booting the communication port using the fast-boot mode, the processor is configured to load from memory previously-estimated values of the one or more parameters. In an embodiment, the processor is configured to autonomously maintain up-to-date values of the one or more parameters in the memory.

There is additionally provided, in accordance with an embodiment of the present invention, a method including, in a network element that supports a full-boot mode and a fast-boot mode, communicating via a communication port of the network element with a peer communication port of a peer network element. By negotiation with the peer network element, it is established whether the fast-boot mode is supported both for the communication port and for the peer communication port. In response to finding that the fast-boot mode is supported both for the communication port and for the peer communication port, a boot the communication port and of the peer communication port are coordinated with the peer network element, both using the fast-boot mode.

There is also provided, in accordance with an embodiment of the present invention, a computer software product, the product including a tangible non-transitory computer-readable medium in which program instructions are stored. The instructions, when read by a processor of a network element, the network element having at least one communication port that is configured to communicate with a peer communication port of a peer network element, cause the processor to support a full-boot mode and a fast-boot mode, to establish, by negotiation with the peer network element, whether the fast-boot mode is supported both for the communication port and for the peer communication port, and, in response to finding that the fast-boot mode is supported both for the communication port and for the peer communication port, coordinate with the peer network element a boot of the communication port and of the peer communication port, both using the fast-boot mode.

The present invention will be more fully understood from the following detailed description of the embodiments thereof, taken together with the drawings in which:

DETAILED DESCRIPTION OF EMBODIMENTS

Overview

Figure 1:
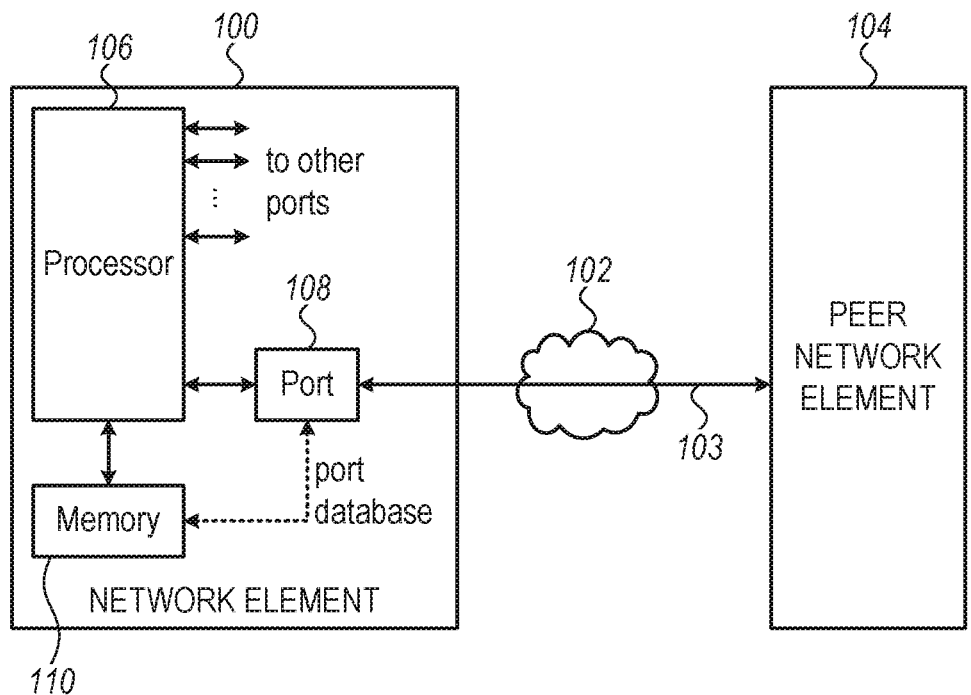
FIG. 1 is a block diagram that schematically illustrates a Network Element, in accordance with an embodiment of the present invention.

Network elements such as routers or switches (or any other suitable network element types) are sometimes disconnected from the network, e.g., for software updates, for debugging, or due to power failure. To reconnect to the network, the network element may need to reestablish fast communication links with peer network elements. However, for multi-gigabit links, establishing the high speed link requires link equalization, and may take a long period of time (e.g., 3 seconds). (Information on line equalization can be found, for example, in "Equalization techniques for high data rates," D. Bucur et. al, IEEE 23rd International Symposium, for Design and Technology in Electronic Packaging (SIITME), October 2017.)

The equalization parameters of a link (such as pre and post emphasis filter coefficients in the transmitter, phase offset for channels in the receiver, and others), which are estimated by the link equalization process, are physically determined by the electrical parameters of the link. Assuming the physical link does not change during the time that the network element was disconnected, the electrical parameters may change slightly, due to secondary effects such as different temperature and, possibly, aging.

Embodiments according to the present invention provide for systems and methods wherein fast link boot may be achieved by using the last saved equalization parameters. In embodiments, a network element saves the last equalization and other link parameters (will be referred to as "port database") in memory. In some embodiments, the memory used for port database storage may be RAM; in other embodiments the memory may be a Non-Volatile memory (NVM), such as Electrically Erasable Programmable Read Only Memory (EEPROM) or a Flash memory. In yet other embodiments, the network element stores the port database in a RAM, and occasionally (e.g., during shut-down) stores the port database in an NVM. In embodiments, the network elements are configured to support a fast link boot, wherein the network element sends the port database to the port, so that link equalization time may be saved.

In practice, however, reverting to fast link boot in a given network element does not shorten the link-up time considerably, unless the peer network element uses fast link boot as well. Conventionally, however, even if the peer network element supports fast link boot, it has no information as to whether its port database is relevant or not, i.e., whether fast link boot is a viable option for the current link-up process. For example, if the given network element was disconnected for a very short period of time, it is likely that the electrical parameters of the link have not changed considerably, and therefore fast link boot is likely to succeed. If, on the other hand, the given network element was disconnected for a long time, or if some port hardware was replaced, the port database of the peer network element may be entirely obsolete and fast link boot is likely to fail. Conventionally, the peer network element has no way of distinguishing between these cases.

Thus, in some embodiments, when booting a link, the network element first negotiates with the peer network element, and, if both network elements support fast-boot, the network element may coordinate with the peer network element to boot the link parameters from memory, significantly reducing the link boot time. In an example embodiment, as part of the coordination, the network element notifies the peer network element that fast link boot is not only supported but also requested. In response, the two network elements will boot the link using fast link boot.

More details will be disclosed in the System Description hereinbelow, with reference to example embodiments.

System Description

The term network element, in the context of the present invention, applies to any electronic device that is connected to a communication network. As such, the term includes (but is not limited to) routers, network switches, network adapters such as network interface controllers (NICs) and host channel adapters (HCAs), and communication hubs.

A network element comprises at least one communication port, operable for communicating data with peer network elements. To establish communication between ports of peer network element, a link-boot (or link-up) process takes place, wherein the two network elements may identify each other, and decide on an optimal link data transfer parameters.

When multi-gigabit links are used, establishing the link parameters for optimal performance ("line equalization") may take a considerable amount of time. Typically, the link is initially set at a low speed rate, which does not require equalization. The low speed rate is used for transfer of data pertaining to the link setup between the peer network elements. After the equalization is completed, the two network elements start communicating at high speed. If high communication problems occur, the peer network elements may revert to low speed communication, and attempt to solve the high speed communication problem.

In the description hereinbelow, the term "boot" will refer to "link-boot"; the term "fast-boot" will refer to fast link-boot (or fast link-up) and the term "full boot" will refer to full ink boot.

In embodiments according to the present invention, the last equalization parameters (referred to as port database) may be stored in memory, and when the network element reconnects to the network (e.g., following software upgrade), the network element may load the stored parameters into the port, significantly reducing the linkup time. This faster boot is only possible if the peer network element is also fast-boot capable; moreover, in embodiments, fast boot, although supported, may not be requested. Hence, negotiations between the peer network elements must take place before fast-boot is used.

FIG. 1 is a block diagram that schematically illustrates a Network Element 100, in accordance with an embodiment of the present invention. The network element is coupled via a direct network link 103 to a Peer Network Element 104, as part of a Network 102 (e.g., an Ethernet or InfiniBand™ network).

Network Element 100 comprises a processor 106, at least one communication port 108, and a memory 110. The processor may comprise, for example, an ARM or a RISC-V. In other embodiments, processor 106 may comprise a Graphics Processing Unit (GPU) or any other suitable type of processor. Port 108 is bidirectional, and establishes a link with ports of peer network elements through the network. As would be appreciated, Network Element 100 may comprise numerous additional components, such as additional ports, packet routing circuitry, security circuits, packet classifiers, congestion control circuitry and others, that are not shown in FIG. 1, for simplicity.

The process of establishing a high speed link between port 108 and a peer port of peer network element 104 is referred to as linkup, and may include line equalization. As part of the equalization process, some transmission parameters (e.g. transmission bit-rate, pre-emphasis or post-emphasis parameters for the transmitter; phase shifts for the receiver) are set. The transmission parameters (and, possibly, other link data) are collectively referred to as Port Database.

According to the example embodiment illustrated in FIG. 1, Network Element 100 further comprises a Memory 110, which stores the port database. In embodiments, any type of memory may be used. In some embodiments, memory 110 is also used for data and/or code storage by processor 106. In another embodiment, memory 110 may be dedicated to port 108, or to a group of ports.

After link-up the network element writes the port database in RAM 110. During network operation, the link parameters may occasionally change. In some embodiments, the network element may initiate full or partial equalization in response to high link error-rate; in other embodiments the transmission bit rate may be modified; in yet other embodiments the phase offset at the receiver may change. The network element may update the port database when such modifications occur.

According to the example embodiment illustrated in FIG. 1, for fast linkup, the network element loads the port database from memory 110 to port 108, so that the linkup process will be shortened (e.g., not include equalization, or will include only partial equalization). In an embodiment, fast link-up follows a negotiation with the peer, and the network element will execute the fast-linkup only if both network elements support fast linkup. If the peer network element does not support fast linkup, full (slower) linkup, including line equalization, will take place (as would be described below, there may be other occasions wherein the network element will execute a full rather than a fast linkup).

As would be appreciated, Network element 100 illustrated in FIG. 1 and described hereinabove is cited by way of example. In alternative embodiments, for example, a plurality of processors of the same or of different types may be used; in an embodiment, memory 110 may be external to network element 110, connected for example, by a serial link. In other embodiments, memory 110 may comprise a hierarchy of memories.

In some embodiments, processor 106 comprises one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory. In other embodiments, processor 106 may comprise hard-wired logic circuitry such as a Finite-State-Machine (FSM). In yet other embodiments, processor 106 may be a combination of one or more general purpose programmable processors, and hard-wired logic circuitry.

Figure 2:
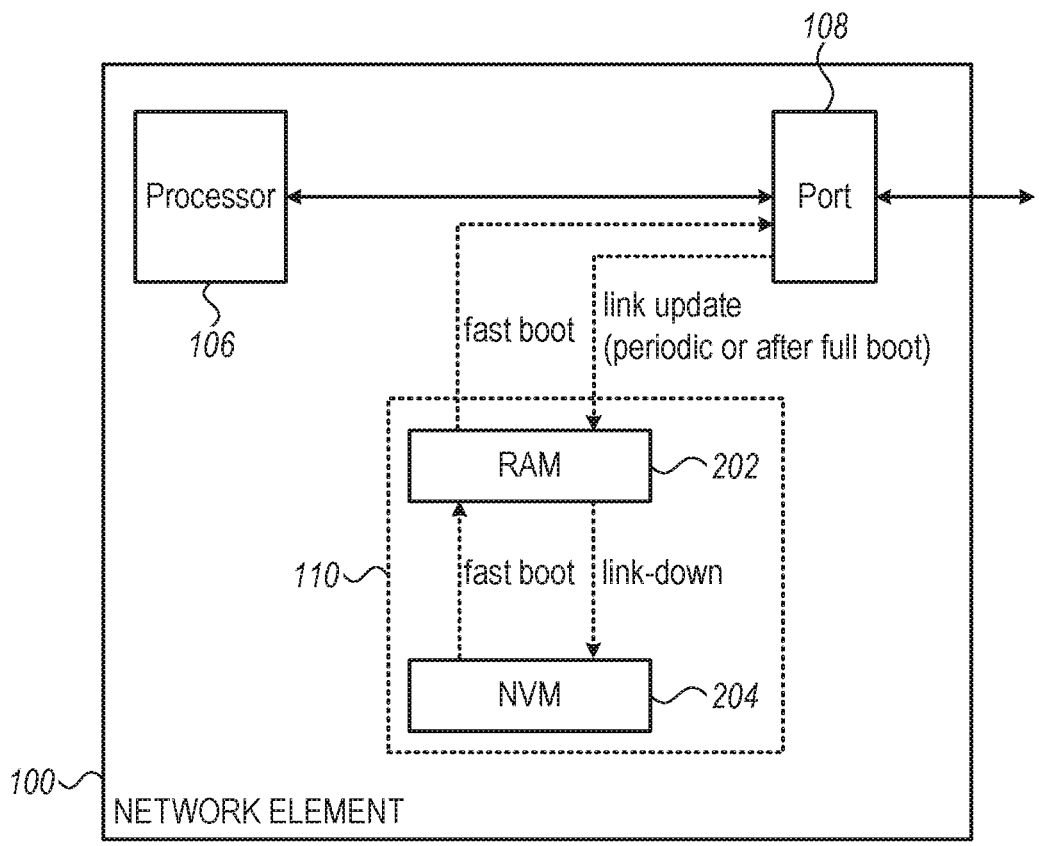
FIG. 2 is a block diagram that schematically illustrates port database storage hierarchy, in accordance with an embodiment of the present invention.

FIG. 2 is a block diagram that schematically illustrates port database storage hierarchy, in accordance with an embodiment of the present invention. 2 is like FIG. 1, illustrating Network Element 100 and its components—processor 106, port 108 and memory 110. According to the example embodiment illustrated in FIG. 2, Memory 110 comprises a RAM 202 and a Non-Volatile Memory (NVM), such as an EEPROM or a flash 204. The network element stores the complete port database in RAM following full link boot, and partially updates the port database when link parameters are updated (the network element may initiate partial link updates periodically, at all time or when the communication quality decreases).

When network element 100 shuts down, e.g., for maintenance, the network element may first store the port database in NVM 204. When the network element boots, the processor copies the port database from NVM 204 to RAM 202 and checks if the port database is valid (techniques to check if the port database is valid will be described below).

If the port database is valid, and if the peer network element supports fast boot, the network element may execute a fast boot of the port by copying the port database to the port.

As would be appreciated, Network element 100 and the structure of memory 200 illustrated in FIG. 1 and described hereinabove are cited by way of example. In alternative embodiments, for example, PAM 202 may be embedded in the port. In some embodiments, there is no RAM 202, and the port database s directly stored in NVM 204. In an embodiment, RAM 202 comprises registers in port 108; in another embodiment, the port database is distributed between port registers and RAM storage.

Figure 3:
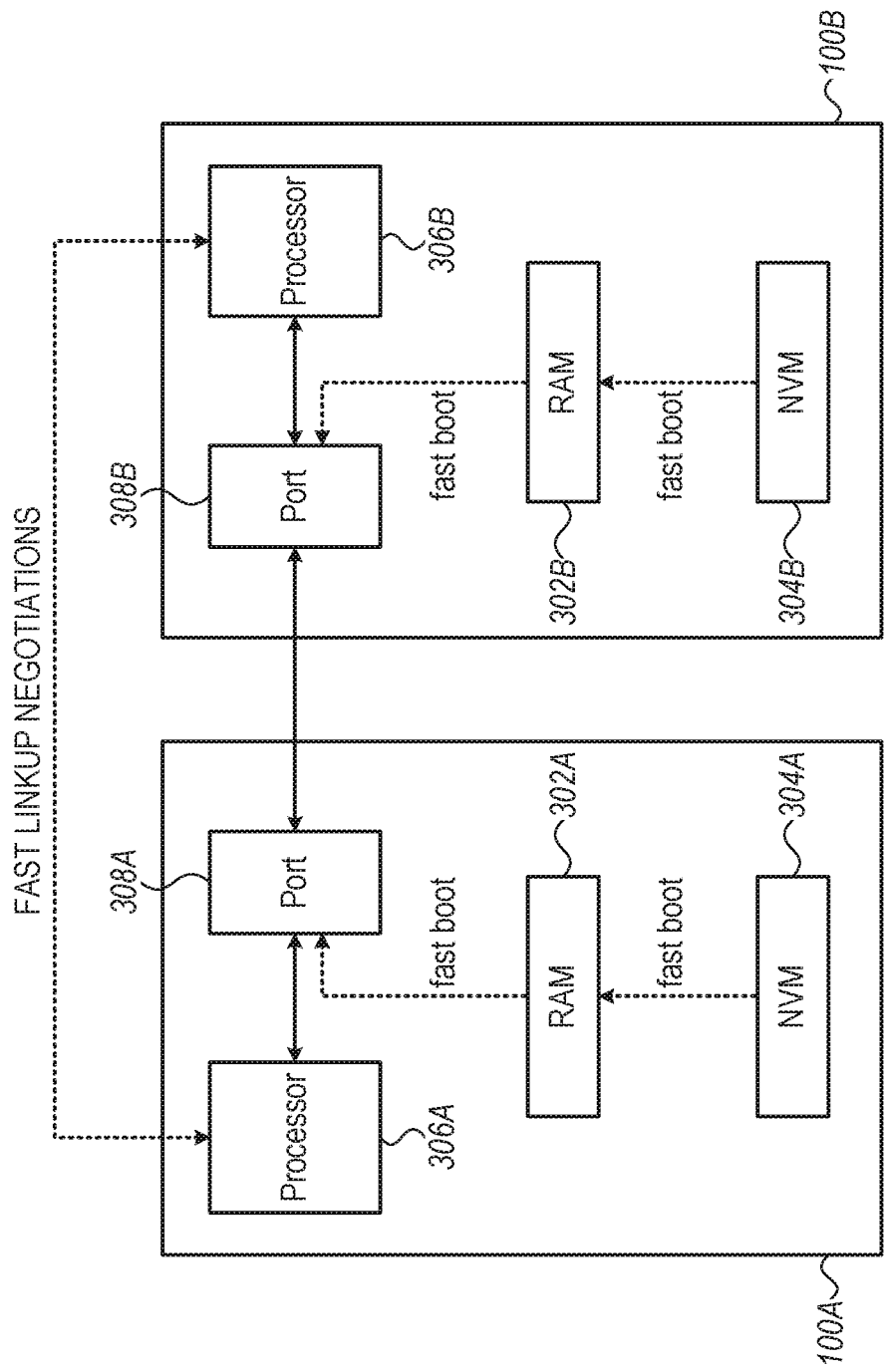
FIG. 3 is a block diagram that schematically illustrates fast boot of peer network elements, in accordance with an embodiment of the present invention.

FIG. 3 is a block diagram that schematically illustrates fast boot of peer network elements, in accordance with an embodiment of the present invention. A Network Element 100A, comprising a Processor 306A, a Port 308A, a PAM 302A and an NVM 304A, is coupled to a Network Element 100B, similarly comprising a Processor 306B, a Port 308B, a RAM 302 and an NVM 304B. In some embodiments, one or both processors 306A, 306B and one or both ports 308A, 308B may be identical, respectively, to processor 106 and port 108 (FIG. 1). Similarly, in embodiments, one or both RAMS 302A, 302B and one or both NVMs 304A, 304B may be identical, respectively, to RAM 202 and NVM 204 (FIG. 2).

Initially, the link between the two network elements is inoperative. This may have been caused when one of the network elements, e.g., 100A, was shut-down. Peer network element 100B, unable to communicate, stops communication through port 308B, but may continuously attempt to reestablish communication with network element 100A.

When Network Element 100A boots, the network element may load the port database From the NVM to the RAM. In parallel processor 306A negotiates with processor 306B of network element 100B, and each network elements checks whether the peer network element supports fast-boot. If the two peer network elements support fast-boot, and if both network element have valid port databases, no line equalization is needed—the network elements will send the respective port databases to the ports, and will fast-boot the link. If any of the network elements does not support fast-boot, or, if at any of the network elements the port database is not valid, full link boot will take place, including line equalization (there may be other cases where full rather than fast link-up will take place, as will be described hereinbelow.

In-Service Software Upgrade (ISSU) and Fast Boot

ISSU is a technique that facilitates fast software upgrade without stopping system services. According to embodiments, ISSU may sometimes be exercised (depending on the nature of the software upgrade) without resetting the communication ports and, thus, no link-up time may be needed. This will be referred to as no-port-toggle ISSU. In embodiments, when booting a network element after a no-port-toggle ISSU, the network element will not execute (and will not request the peer network element to execute) the fast-boot procedure described herein.

Figure 4:
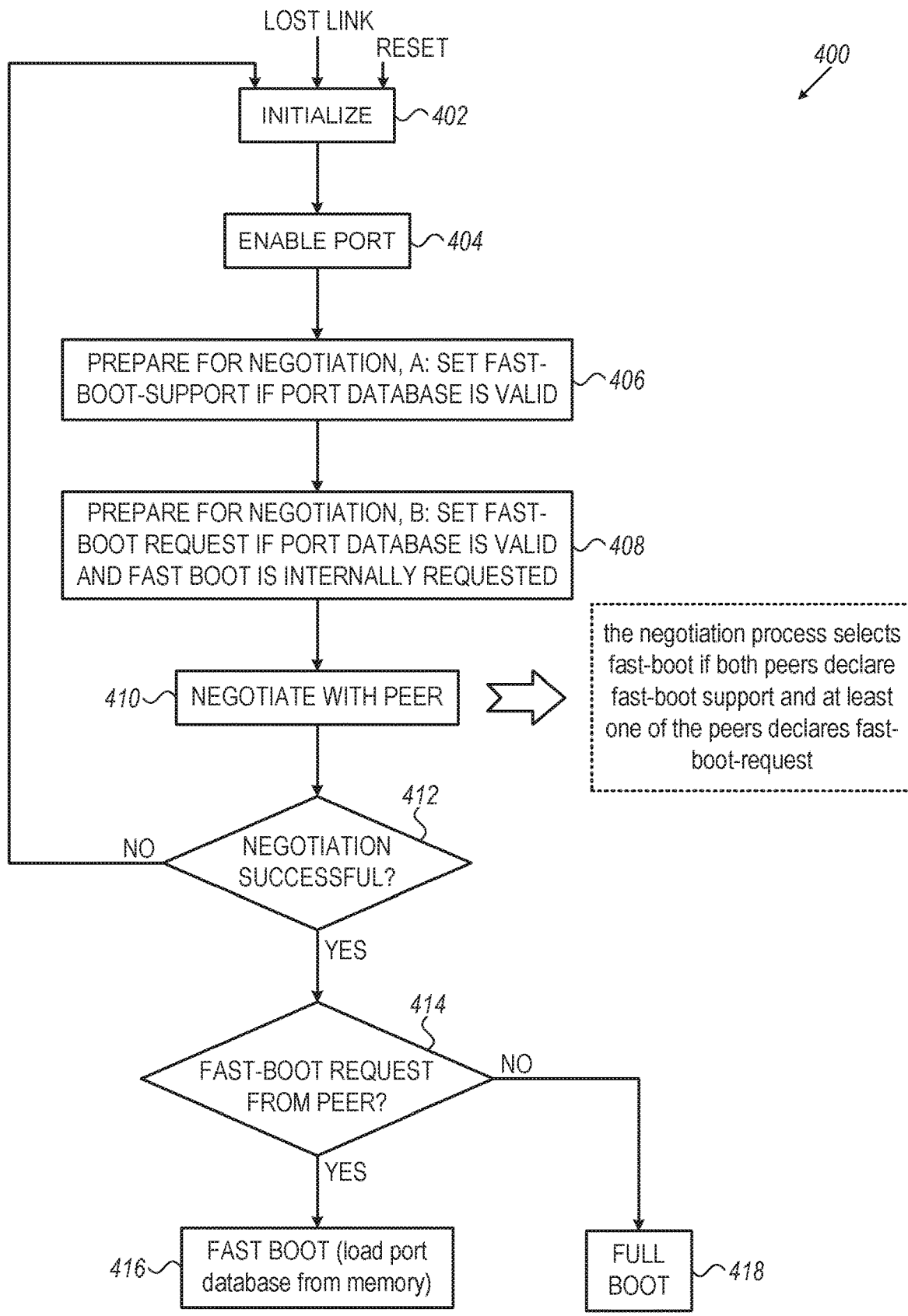
FIG. 4 is a flowchart that schematically illustrates a method for booting a communication link in accordance with an embodiment of the present invention.

FIG. 4 is a flowchart 400 that schematically illustrates a method for booting a communication link in accordance with an embodiment of the present invention. The flow is executed by processor 106 (FIG. 1). The flow starts at an initialize step 402, wherein the processor initializes, in preparation for link booting. The processor may enter the Initialize step after reset (hardware reset or software reset; e.g., as part of an initialization procedure). In embodiments, the network element may also enter the Initialize step when the communication link is lost; e.g., when the peer network element is turned off.

Next, the processor, in preparation for link establishment, enters an Enable Port step 404, enables the port, and proceeds to a PREPARE-NEGOTIATIONS-A step 406.

Link establishment is preceded by negotiations between the peer network elements. The negotiations include declarations of capabilities and requests, which is followed by a joint link configuration agreement. According to the example embodiment illustrated in FIG. 4, the negotiations comprise selecting between fast link boot and full link boot. In the negotiations, each network element declares fast-boot support and fast-boot request.

In PREPARE-NEGOTIATIONS-A step 406, the processor checks if the stored port database is valid. If so, the processor will declare fast-boot-support during the negotiations. Next, in a PREPARE-NEGOTIATIONS-B step 408, the processor checks if fast-boot is internally requested (according to an embodiment, fast boot will only be requested following a firmware upgrade that does not need a power cycle, including (but not limited to) no-port-toggle ISSU. If fast-boot is internally requested and the port database is valid, the processor will declare fast-boot-request during the negotiations.

Next, at a Negotiate step 410, the processor negotiates the link configuration with the peer network element. According to the example embodiment illustrated in FIG. 4, the peer network elements will determine fast-boot during the negotiations if both peers declare fast-boot-support and at least one of the peers declares fast-boot request, and, at least one of the peers internally requests fast-boot.

After Negotiation step 412, the processor will proceed to a Check-Negotiations-Success step 412 if the peer network element is still shut-down if, for any other reason, the communication link inoperative), the negotiations will fail, and the processor will reenter step 402 for an additional attempt to establish communication over the link.

If, in step 412, the negotiations are successful, the processor will enter a Check-Fast-Boot step 414 and check whether a fast boot was agreed in the negotiation. If so, the processor will enter a Fast-Boot step 416, wherein the processor copies the port database from memory to the port. If, in step 414, fast boot has not been agreed, the processor will enter a Full-Boot step 418 and execute a full boot, including line equalization.

As would be appreciated, the flow-chart illustrated in the example embodiment of FIG. 4 and described above is cited by way of example. Other suitable flowcharts may be used in alternative embodiments. For example, some of the steps may be executed concurrently or in a different order. In an embodiment, separate negotiations may take place for the two link directions; e.g., a fast boot may be configured for the transmission from network element 100A to network element 100B (FIG. 3), and a full boot for the transmission from 100B to 100A.

The configuration of Network Element and fast-boot method flowchart, illustrated in FIGS. 1 through 4, are example configurations and flowchart that are depicted Purely for the sake of conceptual clarity. Any other suitable configurations and flowcharts can be used in alternative embodiments. The network element and components thereof may be implemented using suitable hardware, such as in one or more Application-Specific Integrated Circuit (ASIC) or Field-Programmable Gate Arrays (FPGA), using software, using hardware, or using a combination of hardware and software elements.

Although the embodiments described herein mainly address fast boot in network elements, the methods and systems described herein can also be used in other applications, such as in applications that have a long process time (e.g. "training") across multiple decentralized edge devices, including but not limited to federated learning.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A network element, comprising:
at least one communication port, configured to communicate with a peer communication port of a peer network element; and
a processor, configured to:
support a full-boot mode and a fast-boot mode;
establish, by negotiation with the peer network element, whether the fast-boot mode is supported both for the communication port and for the peer communication port; and
in response to finding that the fast-boot mode is supported both for the communication port and for the peer communication port, coordinate with the peer network element a boot of the communication port and of the peer communication port, both using the fast-boot mode,
wherein the processor establishes, by negotiation, whether the fast-boot mode is supported, by sending to the peer network element a notification that indicates that the fast-boot mode is supported for the communication port and receiving from the peer network element notification that indicates that the peer network element supports the fast-boot mode.

2. The network element according to claim 1, wherein the processor is configured to receive from the peer network element notification that indicates that the peer network element supports the fast-boot mode, and, in response to the notification, boot the communication port using the fast-boot mode.

3. The network element according to claim 1, wherein the processor is configured to send to the peer network element a notification that indicates that the fast-boot mode is supported for the communication port, and that requests the peer network element to boot the peer communication port using the fast-boot mode.

4. The network element according to claim 1, wherein:
when booting the communication port using the full-boot mode, the processor is configured to estimate values of one or more parameters for the communication port; and
when booting the communication port using the fast-boot mode, the processor is configured to load from memory previously-estimated values of the one or more parameters.

5. The network element according to claim 4, wherein the processor is configured to autonomously maintain up-to-date values of the one or more parameters in the memory.

6. The network element according to claim 1, wherein the full-boot mode includes link equalization of a link between the at least one communication port and the peer communication port, and the fast-boot mode uses previously stored equalization parameters.

7. The network element according to claim 1, wherein the processor is configured to load from memory previously-estimated values of the one or more parameters required for fast-boot mode, in parallel to the negotiation with the peer network element.

8. The network element according to claim 1, wherein the processor is configured to avoid using the fast-boot mode after a no-port-toggle in-service software upgrade ISSU.

9. The network element according to claim 1, wherein the sent and received notifications include declarations of capabilities and requests regarding fast boot.

10. A method, comprising:
in a network element that supports a full-boot mode and a fast-boot mode, communicating via a communication port of the network element with a peer communication port of a peer network element;
establishing, by negotiation with the peer network element, whether the fast-boot mode is supported both for the communication port and for the peer communication port; and
in response to finding that the fast-boot mode is supported both for the communication port and for the peer communication port, coordinating with the peer network element a boot of the communication port and of the peer communication port, both using the fast-boot mode,
wherein establishing, by negotiation, whether the fast-boot mode is supported, comprises sending to the peer network element a notification that indicates that the fast-boot mode is supported for the communication port and receiving from the peer network element notification that indicates that the peer network element supports the fast-boot mode.

11. The method according to claim 10, wherein coordinating the boot comprises receiving from the peer network element a notification that indicates that the peer network element supports the fast-boot mode, and, in response to the notification, booting the communication port using the fast-boot mode.

12. The method according to claim 10, wherein coordinating the boot comprises sending to the peer network element a notification that indicates that the fast-boot mode is supported for the communication port, and that requests the peer network element to boot the peer communication port using the fast-boot mode.

13. The method according to claim 10, wherein coordinating the boot comprises:
when booting the communication port using the full-boot mode, estimating values of one or more parameters for the communication port; and
when booting the communication port using the fast-boot mode, loading from memory previously-estimated values of the one or more parameters.

14. The method according to claim 13, and comprising autonomously maintaining up-to-date values of the one or more parameters in the memory.

15. A computer software product, the product comprising a tangible non-transitory computer-readable medium in which program instructions are stored, which instructions, when read by a processor of a network element, the network element having at least one communication port that is configured to communicate with a peer communication port of a peer network element, cause the processor to:
support a full-boot mode and a fast-boot mode;
establish, by negotiation with the peer network element, whether the fast-boot mode is supported both for the communication port and for the peer communication port; and
in response to finding that the fast-boot mode is supported both for the communication port and for the peer communication port, coordinate with the peer network element a boot of the communication port and of the peer communication port, both using the fast-boot mode,
wherein establishing, by negotiation, whether the fast-boot mode is supported, comprises sending to the peer network element a notification that indicates that the fast-boot mode is supported for the communication port and receiving from the peer network element notification that indicates that the peer network element supports the fast-boot mode.

16. The product according to claim 15, wherein the instructions cause the processor to receive from the peer network element a notification that indicates that the peer network element supports the fast-boot mode, and, in response to the notification, boot the communication port using the fast-boot mode.

17. The product according to claim 15, wherein the instructions cause the processor to send to the peer network element a notification that indicates that the fast-boot mode is supported for the communication port, and that requests the peer network element to boot the peer communication port using the fast-boot mode.

18. The product according to claim 15, wherein:
when booting the communication port using the full-boot mode, the instructions cause the processor to estimate values of one or more parameters for the communication port; and
when booting the communication port using the fast-boot mode, the instructions cause the processor to load from memory previously-estimated values of the one or more parameters.

19. The product according to claim 18, wherein the instructions cause the processor to autonomously maintain up-to-date values of the one or more parameters in the memory.

* * * * *